United States Patent
Hashmi et al.

(10) Patent No.: US 11,310,855 B2
(45) Date of Patent: Apr. 19, 2022

(54) METHODS AND SYSTEMS FOR MANAGING BEARER CONFIGURATION OF USER EQUIPMENT WITH EN-DC CAPABILITY

(71) Applicant: SAMSUNG ELECTRONICS CO., LTD., Suwon-si (KR)

(72) Inventors: Danish Ehsan Hashmi, Bangalore (IN); Pratibha Kattemane Satyaganapati, Bangalore (IN); Shouvik Guha, Bangalore (IN); Arijit Sen, Bangalore (IN); Ramesh Chandra Vuppala, Bangalore (IN); Satheesh Kumar Rampelli, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 16/787,746

(22) Filed: Feb. 11, 2020

(65) Prior Publication Data
US 2020/0260515 A1 Aug. 13, 2020

(30) Foreign Application Priority Data

Feb. 12, 2019 (IN) .............................. 201941005541
Jan. 3, 2020 (IN) .............................. 201941005541

(51) Int. Cl.
*H04L 5/00* (2006.01)
*H04W 8/24* (2009.01)
(Continued)

(52) U.S. Cl.
CPC .......... *H04W 76/15* (2018.02); *H04L 5/0055* (2013.01); *H04W 8/24* (2013.01); *H04W 24/10* (2013.01);
(Continued)

(58) Field of Classification Search
CPC . H04B 7/02–026; H04B 17/0082–3913; H04J 11/0023–0093;
(Continued)

(56) References Cited

U.S. PATENT DOCUMENTS

2018/0199355 A1  7/2018  Wu
2018/0376384 A1  12/2018  Youn et al.
(Continued)

FOREIGN PATENT DOCUMENTS

EP          3422799 A1    1/2019
WO      2018/029578 A1    2/2018
(Continued)

OTHER PUBLICATIONS

"UE Radio Capability Update using TAU procedure" 3GPP TSG-CT WG1 Meeting #111, Osaka, Japan, May 21-25, 2018, C1-183754, (9 pages total).
(Continued)

*Primary Examiner* — Timothy J Weidner
(74) *Attorney, Agent, or Firm* — Sughrue Mion, PLLC

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Methods and systems for managing bearer configuration of user equipment (UE) with Evolved-Universal Terrestrial Radio Access Network-New Radio-Dual Connectivity (E-UTRAN-NR-DC) (EN-DC) capability. The UE detects connectivity issues in the UE itself and in interfaces
(Continued)

connecting between a NR network with the UE, a LTE network, or an EPC that require disabling NR capability of the UE. The bearer configuration is determined and updated based on the detected connectivity issues. The UE signals the LTE network about the disabling of NR capability, requests enabling of data transfer through bearers of a MCG bearers associated with the LTE network in a current MCG RRC session, and prevents addition of SCG bearers associated with the NR network. The UE recovers data in the SCG bearers, lost due the issues in the NR network, through the MCG bearers. The UE can send a Tracking Area Update (TAU) to indicate the disabling of NR capability if the connectivity issues persist.

16 Claims, 10 Drawing Sheets

(51) Int. Cl.

| | | |
|---|---|---|
| H04W 24/10 | (2009.01) | |
| H04W 28/02 | (2009.01) | |
| H04W 28/08 | (2009.01) | |
| H04W 36/00 | (2009.01) | |
| H04W 36/30 | (2009.01) | |
| H04W 52/02 | (2009.01) | |
| H04W 76/15 | (2018.01) | |
| H04W 76/19 | (2018.01) | |
| H04W 76/27 | (2018.01) | |
| H04W 76/34 | (2018.01) | |
| H04W 80/08 | (2009.01) | |
| H04W 84/04 | (2009.01) | |
| H04W 84/20 | (2009.01) | |
| H04W 88/06 | (2009.01) | |
| H04W 88/10 | (2009.01) | |
| H04W 92/02 | (2009.01) | |
| H04W 92/10 | (2009.01) | |

(52) U.S. Cl.
CPC ...... *H04W 28/0236* (2013.01); *H04W 28/0815* (2020.05); *H04W 36/0069* (2018.08); *H04W 36/305* (2018.08); *H04W 52/0274* (2013.01); *H04W 76/19* (2018.02); *H04W 76/27* (2018.02); *H04W 76/34* (2018.02); *H04W 80/08* (2013.01); *H04W 84/042* (2013.01); *H04W 84/20* (2013.01); *H04W 88/06* (2013.01); *H04W 88/10* (2013.01); *H04W 92/02* (2013.01); *H04W 92/10* (2013.01)

(58) Field of Classification Search
CPC ....... H04L 5/0001–0098; Y02D 30/70; H04W 8/22–245; H04W 24/02–10; H04W 28/02–26; H04W 36/0005–385; H04W 48/02–20; H04W 52/02–0296; H04W 60/005–06; H04W 76/10–50; H04W 80/02–12; H04W 84/005–22; H04W 88/005–188; H04W 92/02–24
See application file for complete search history.

(56) References Cited

U.S. PATENT DOCUMENTS

| | | | |
|---|---|---|---|
| 2019/0045568 A1 | 2/2019 | Palat et al. | |
| 2019/0208474 A1 | 7/2019 | Ali et al. | |
| 2019/0253908 A1 | 8/2019 | Fan et al. | |
| 2019/0289510 A1 | 9/2019 | Rugeland et al. | |
| 2020/0053810 A1 | 2/2020 | Lee et al. | |
| 2020/0059395 A1* | 2/2020 | Chen | H04W 76/19 |
| 2020/0305213 A1* | 9/2020 | Teyeb | H04W 72/14 |

FOREIGN PATENT DOCUMENTS

| | | |
|---|---|---|
| WO | 2018/128572 A1 | 7/2018 |
| WO | 2018182254 A1 | 10/2018 |
| WO | 2018228560 A1 | 12/2018 |

OTHER PUBLICATIONS

"Alignment of radio capabilities procedure" 3GPP TSG-SA WG2 Meeting #127bis, Newport Beach, USA, May 28-Jun. 1, 2018, S2-186178, (2 pages total).
"3GPP; TSG RAN; Evolved Universal Terrestrial Radio Access (E-UTRA) and NR; Mutli-connectivity; Stage 2 (Release 15)", 3GPP TS 37.340 V15.4.0, Jan. 14, 2019, section 10.
3GPP; TS 36.331 V15.4.0, Technical Specification Group Radio Access Network; Evolved Universal Terrestrial Radio Access, Radio Resource Control, Protocol specification, Release 15, Dec. 2018, pp. 360-362.
International Search Report (PCT/ISA/210) and Written Opinion (PCT/ISA/237) dated May 25, 2020 by the International Searching Authority in counterpart International Patent Application No. PCT/KR2020/001927.
Communication dated Oct. 20, 2021 by the Indian Patent Office in Indian Patent application No. 201941005541.
Anonymous: "3rd Generation Partnership Project; Technical Specification Group Radio Access Network; Evolved Universal Terrestrial Radio Access (E-UTRA) and NR; Multi-connectivity; Stage 2 (Release 15)", 3GPP Standard; Technical Specification; 3GPP TS 37.340, 3rd Generation Partnership Project (3GPP), Mobile Competence Centre; 650, Route Des Lucioles; F-06921 Sophia-Antipolis Cedex; France, RAN WG2, V15.3.0, pp. 1-59, XP051487370, Sep. 25, 2018.
Qualcomm Incorporated: "SCG-RLF handling in EN-DC", 3GPP Draft; R2-1703569 SCG-RLF Handling in NR, 3rd Generation Partnership Project (3GPP), Mobile Competence Centre; 650, Route Des Lucioles; F-06921 Sophia-Antipolis Cedex; France, vol. RAN WG2, Spokane, USA; Apr. 3, 2017-Apr. 7, 2017, XP051245408, Apr. 3, 2017, 3 pages, Retreived from the Internet: URL:http://www.3gpp.org/ftp/Meetings_3GPP_SYNC/RAN2/Docs [retreived on Apr. 3, 2017].
NEC: "SCG failure indication from MN to SN", 3GPP Draft; R2-1707377_SCG Failure, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, XP051307406, Jun. 17, 2017, 4 pages, Retrieved from the Internet: URL:http://www.3gpp.org/ftp/tsg_ran_WG2_RL2/TSGR2_AHs/2017_06_NRDocs [retreived on Jun. 17, 2017].
Communication dated Feb. 3, 2022 by the European Patent Office in European Patent Application No. 20756308.1.

* cited by examiner

METHODS AND SYSTEMS FOR MANAGING BEARER CONFIGURATION OF USER EQUIPMENT WITH EN-DC CAPABILITY

CROSS REFERENCE TO RELATED APPLICATION

This application claims priority from Indian Provisional Application No. 201941005541 filed on Feb. 12, 2019, and Indian Non-Provisional Application No. 201941005541 filed on Jan. 3, 2020, the contents of which are herein incorporated by reference.

FIELD

Embodiments herein relate to 5th Generation (5G) wireless communication systems, and more particularly to methods and systems for managing bearer configuration in Dual Connectivity (DC) systems.

DESCRIPTION OF THE RELATED ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In 5th Generation (5G) Dual Connectivity (DC) technologies (such as Evolved-Universal Terrestrial Radio Access Network-New Radio (E-UTRAN-NR)-DC (EN-DC), New Generation-Radio Access Network (NG-RAN)-DC (NGEN-DC), and so on), User Equipment (UE) can be enabled to simultaneously connect to 5G-NR and other networks (such as 4th Generation (4G) Long Term Evolution (LTE) networks). In an example, if a UE is configured to implement EN-DC capability, a flow of data between the UE and a Core Network (CN) (LTE or NR) can be split between the E-UTRAN and NG-RAN. In EN-DC, control of DC can be handled by an evolved Node B (eNB) in the E-UTRAN.

FIG. 1 illustrates an example flow of data between a UE and a CN through base stations in an E-UTRAN and an NG-RAN. As depicted in FIG. 1, for an EN-DC system, the CN is an Evolved Packet Core (EPC). The E-UTRAN includes an eNB that connects the UE to the EPC. The NG-RAN includes a next generation Node B (gNB) that connects the UE to the EPC. An S1-U interface can be used to transfer data between the EPC and the eNB, and the EPC and the gNB. The UE can receive data from either of the eNB, gNB, or both, based on a configuration (non-split bearer in eNB/gNB, split bearer eNB/gNB) for data transmission. An issue in the S1-U interface between either of the EPC and the gNB, a Xx Link between the eNB and the gNB, and an air interface between the UE and the gNB, may necessitate the transfer of data (between the UE and EPC) through the eNB.

Currently, if the UE intends to disable NR radio capability, a Tracking Area Update (TAU) request is sent to the Mobility Management Entity (MME) of the EPC. However, the TAU request can be sent only when the UE is in idle mode, such that a RAN can update radio capabilities of the UE (by disabling the NR capability of the UE). The process of disabling the NR radio capability may be delayed if there is an active data connection existing between the UE and the eNB.

FIG. 2 is a sequence diagram illustrating a scenario in which there is loss of continuity of data transfer due to bearer deactivation. Consider that a UE with EN-DC capability has established a connection with a public data network (PDN) through an EN-DC network. The UE is receiving data packets without continuity. Dual Connectivity with NR may be unsuitable in this scenario. If the UE detects that data packets have not been received for a period of time, the UE can initiate a data recovery procedure. The procedure involves sending a PDN disconnect request to the EN-DC network. The PDN disconnect request is sent without ascertaining the interface (at the eNB or the gNB) in which there is an issue that is preventing data flow. In response to the PDN disconnect request, the EN-DC network can deactivate an Evolved Packet System (EPS) bearer. Thereafter, the connection with the PDN can be re-established and reception of data packets can resume. However, this can result in the loss of continuity of data reception.

If there are issues with the NR interface (at the gNB), then disconnecting the PDN connection may not resolve the issue and the UE may again experience a loss of continuity. In split bearer configuration, there can be issues in one of the interfaces (for example: NR) while data transmission through the other interface (for example: LTE) can occur smoothly. Currently, the interface in which the issue had occurred might not be located and there can be Transport Control Protocol (TCP) retransmissions. Thus, there might be degradation in data throughput.

SUMMARY

Embodiments of the disclosure relate to methods and systems for managing bearer configuration of a User Equipment (UE) with Evolved-Universal Terrestrial Radio Access Network-New Radio (E-UTRAN-NR)-Dual Connectivity (DC) (EN-DC) capability.

Embodiments of the disclosure relate to methods and systems to detect interface connection abnormalities connecting a NR network with an external entity (such as a Long Term Evolution (LTE) network, an Evolved Packet Core (EPC), and User Equipment (UE)); and connectivity issues in the UE itself, in which the UE determines whether the connectivity disruption is temporary, long term, or permanent.

Embodiments of the disclosure relate to methods and systems to determine bearer configuration of the UE and update the bearer configuration based on the connectivity issues, in which the UE informs the LTE network about NR capability of the UE, to enable transfer of data through Master Cell Group (MCG) bearers in a current MCG Radio Resource Control (RRC) session and prevent addition of Secondary Cell Group (SCG) bearers, and in which the MCG bearers are associated with the LTE network and the SCG bearers are associated with the NR network, and in which the UE can continue to transfer data in a data session, which was affected due to the connectivity issues in the NR network, through the MCG bearers.

Embodiments of the disclosure relate to methods and systems to send Tracking Area Updates (TAUs) to indicate an enabling or a disabling of NR capability of the UE if the connectivity issues are long term or permanent.

Accordingly, the embodiments provide methods and systems for managing bearer configuration of a User Equipment (UE) with Evolved-Universal Terrestrial Radio Access Network-New Radio-Dual Connectivity (E-UTRAN-NR-DC) (EN-DC) capability. The embodiments include detecting issues in interfaces connecting a NR network with a Long Term Evolution (LTE) network and the UE. The embodiments include determining a configuration of bearers used for transfer of data between the UE and the EPC through the LTE/NR network, wherein the possible bearer configurations include a Master Cell Group (MCG) split bearer, a Secondary Cell Group (SCG) bearer, and a SCG split bearer. The MCG bearers are associated with the LTE network and the SCG bearers are associated with the NR network. The embodiments include determining whether the detected issues are temporary, long term, or a permanent issue, by monitoring a time period for which the connectivity issues sustain. The embodiments include informing the LTE network about the detected issues, if the issues are temporary.

These and other aspects of the embodiments will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Embodiments herein are taken in conjunction with the accompanying drawings, throughout which like reference letters indicate corresponding parts in the various figures. The embodiments herein will be better understood from the following description with reference to the drawings, in which.

DETAILED DESCRIPTION OF THE EMBODIMENTS

Figure 1:
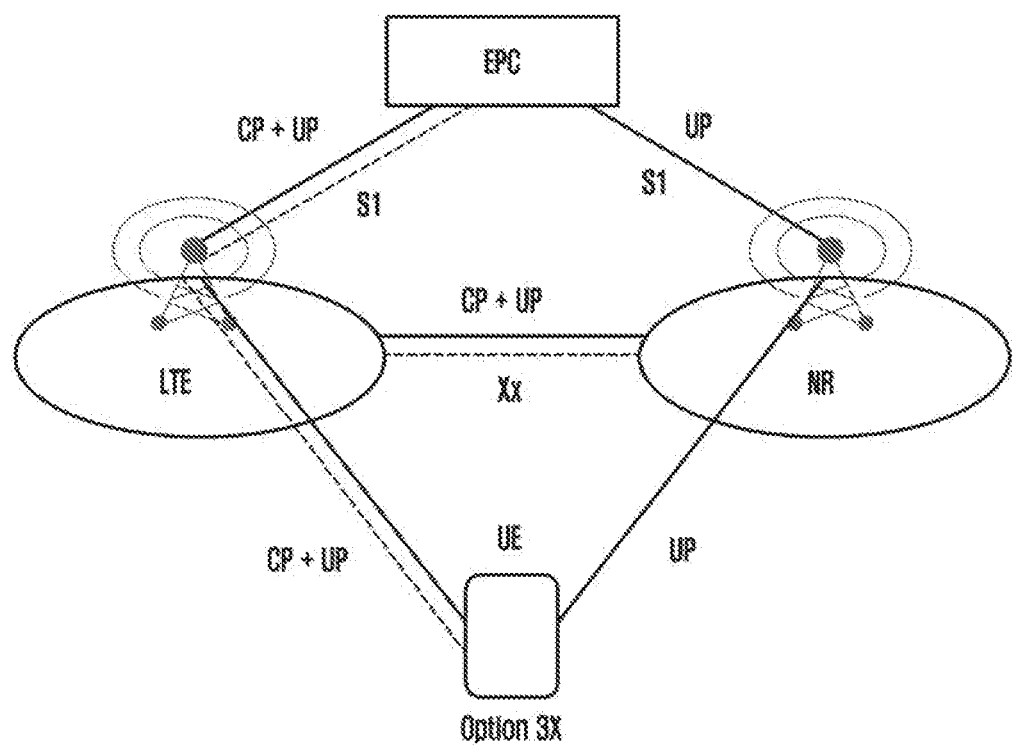
FIG. 1 illustrates an example flow of data between a User Equipment (UE) and a Core Network (CN) through base stations in an Universal Terrestrial Radio Access Network (E-UTRAN) and a Next Generation Radio Access Network (NG-RAN)
Figure 2:
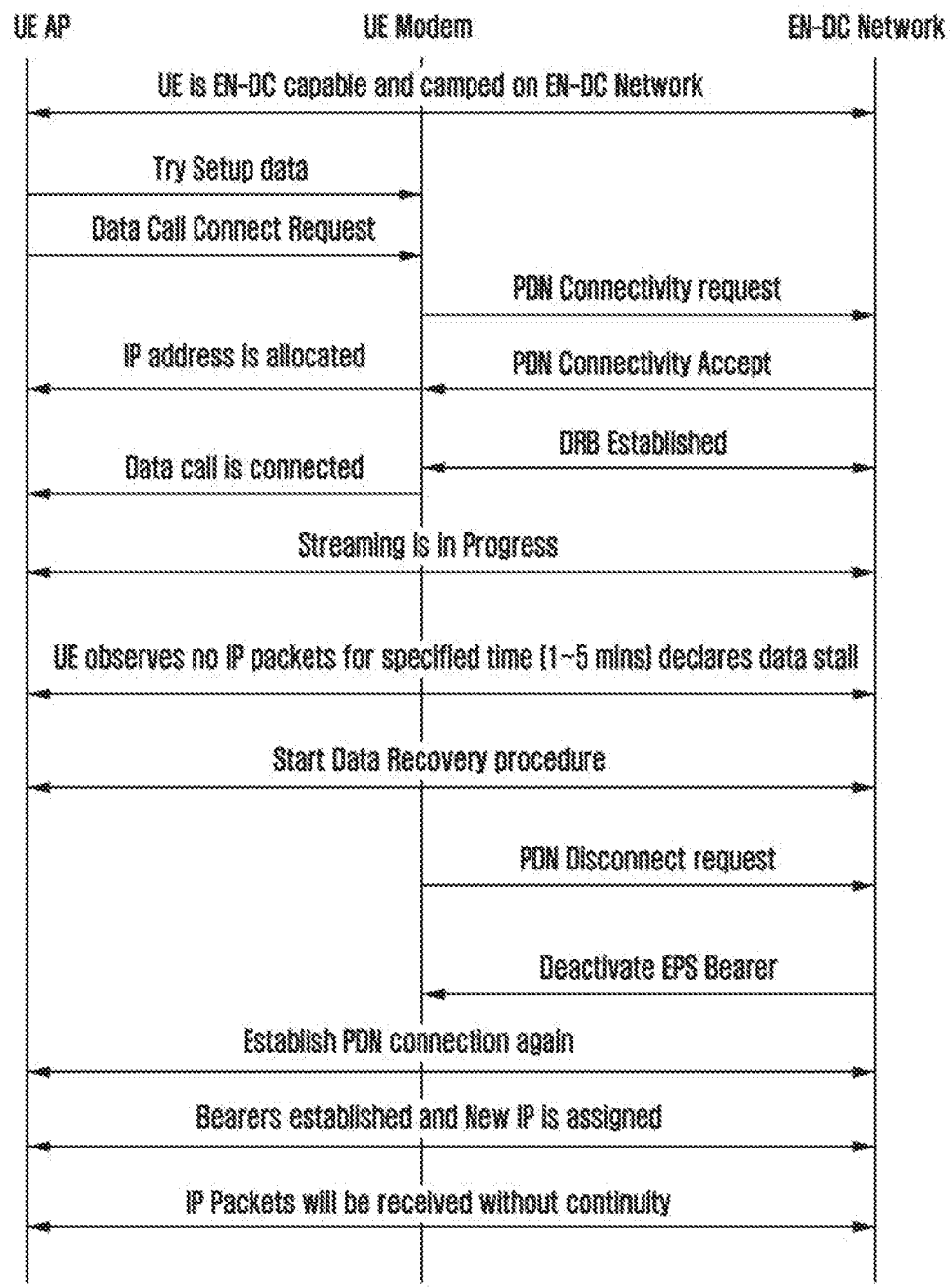
FIG. 2 is a sequence diagram depicting an existing scenario, in which there is loss of continuity of data transfer due to bearer deactivation.

The embodiments herein and the various features and advantageous details thereof are explained more fully with reference to the accompanying drawings and detailed in the following description. Descriptions of well-known components and processing techniques are omitted to avoid unnecessarily obscuring the embodiments. The examples used herein are intended merely to facilitate an understanding of ways in which the embodiments may be practiced and to further enable those of skill in the art to practice the embodiments herein. Accordingly, the examples should not be construed as limiting the scope of the embodiments herein.

Embodiments herein relate to methods and systems for managing bearer configuration of a User Equipment (UE) with Evolved-Universal Terrestrial Radio Access Network-New Radio-Dual Connectivity (E-UTRAN-NR-DC) or (EN-DC) capability. Aspects of the embodiments include detecting issues in interfaces connecting a NR network with an external entity (such as a Long Term Evolution (LTE) network, an Evolved Packet Core (EPC), and the UE). The embodiments include determining a configuration of bearers used for transfer of data between the UE and the EPC through the LTE/NR network, in which the possible bearer configurations include a Master Cell Group (MCG) split bearer, a Secondary Cell Group (SCG) bearer, and a SCG split bearer. The MCG bearers are associated with the LTE network and the SCG bearers are associated with the NR network. The embodiments include determining whether the detected connectivity issues are temporary, long term, or a permanent issue, for example, by monitoring a time period for which the issues sustain. The embodiments include informing the LTE network about the detected connectivity issues, if the connectivity issues are temporary.

In an embodiment, the LTE network can be informed about the inability to transfer data using NR, due to connectivity issues associated with NR interfaces. The LTE network can allow transfer of data through MCG bearers in a current MCG Resource Control (RRC) session for a predefined time period. The embodiments include enabling recovery of data session, through the MCG bearers.

In an embodiment, the LTE network can be informed about the inability to transfer data using NR, due to connectivity issues associated with NR interfaces, by sending SCG failure information. This can indicate to the LTE network to allow transfer of data only through the MCG bearers and prevent addition of SCG bearers in the current MCG RRC session. In an embodiment, the LTE network can be informed about the lack of NR capability by sending UE assistance information. This can indicate to the LTE network to disable SCG bearers.

In an embodiment, the current RRC session can be aborted by releasing the RRC connection. A Tracking Area Update (TAU) request can be sent to the LTE network to inform the LTE network about an inability to transfer data using interfaces associated with the NR network for a predefined period of time, due to issues in the NR interface. The embodiments include initiating data recovery using LTE data recovery methods, wherein lost data, if any, can be recovered through the MCG bearers in a new RRC session. The embodiments include informing the LTE network about enabling of NR, such that the LTE network can add SCG bearers in scenarios, such as expiration of the predefined period of time, detecting a movement of the UE, detecting that the UE is in a different Tracking Area (TA), and so on.

The embodiments will now be referred to with respect to FIGS. 3 through 7.

Figure 3:
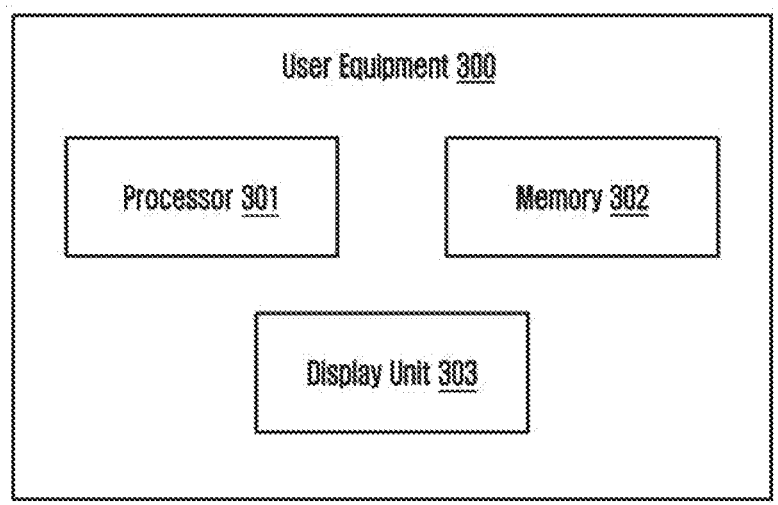
FIG. 3 illustrates various units of a UE with E-UTRAN-New Radio-Dual Connectivity (EN-DC) capability configured to manage bearer configuration while operating in an EN-DC mode, according to an embodiment.

FIG. 3 illustrates various units of a UE 300 with EN-DC capability configured to manage bearer configuration while operating in an EN-DC mode, according to an embodiment. As depicted in FIG. 3, the UE 300 may include a processor 301, a memory 302, and a display unit 303. The processor 301 may be one or more of an application processor, a communication processor, and a data recovery unit. The UE 300 is capable of providing support for EN-DC and may be connected to an EPC through a next generation Node B (gNB) in a 5G RAN (NG-RAN)/NR or 5G network and an evolved Node B (eNB) in a 4G RAN (E-UTRAN)/LTE or 4G network.

The processor 301 may be configured to detect connectivity issues in S1-U interface connecting the EPC and the gNB, in air interfaces (NR Uu) connecting the gNB and the UE 300, and Xx interface between the eNB and the gNB. Examples of the connectivity issues can be, but are not limited to, data stall, heating issues in the UE, issues with state of battery of the UE 300, user initiated disabling of NR, disabling of NR using Artificial Intelligence (AI), and so on. In an example, the Xx interface can be an X2 interface.

The processor 301 may be configured to determine a bearer configuration for the UE 300. Examples of the bearer configurations may be, but are not limited to, MCG bearer, MCG split bearer, SCG split bearer, and SCG bearer. Data transfer between the UE 300 and the eNB/gNB can occur through the bearers. The control of DC is handled by the eNB. The MCG bearers are associated with the eNB and the SCG bearers are associated with the gNB.

The processor 301 may be configured to disable the NR capability of the UE 300 without releasing the existing RRC session associated with the LTE network and a data session in the MCG split bearers/SCG split bearers/SCG bearers can be recovered using MCG bearers.

Consider that the processor 301 detects that the connectivity issue is a data stall occurring in one of the interfaces associated with the gNB. As a result, the UE 300 is unable to receive data packets. The data stall is detected if there are frequent Radio Link (RL) failures, Packet Data Convergence Protocol (PDCP) errors, low data rate, Quality of Service (QoS) is not satisfied, Radio Link Control (RLC) Negative Acknowledgements (NACKS), and so on. If there is a data stall, the UE 300 may be unable to send or receive data using MCG split bearers/SCG split bearers/SCG bearers associated with the gNB. In such circumstances, the processor 301 is configured to disable NR capability of the UE 300 without releasing an existing RRC session associated with the LTE network and recover data in the SCG bearers using MCG bearers associated with the eNB.

Consider that the UE 300 receives priority data on MCG bearers (such as a Voice over LTE (VoLTE) call) and low priority data on MCG split bearers/SCG split bearers/SCG bearers. If the temperature of the UE 300 increases beyond a threshold value, the processor 301 is configured to disable the NR capability of the UE 300. Consider that the State of Charge (SoC) of the battery of the UE 300 is below a threshold level. In this scenario, the processor 301 is configured to disable the NR capability of the UE 300. Consider that the user intends to disable NR capability. The processor 301 can disable the NR capability based on the intention of the user.

In an embodiment, if the UE 300 is configured to implement machine learning and AI capability, the UE 300 can determine whether NR services are required. The UE 300 can monitor usage patterns and forecast time periods during which there will be requirement of NR services. The processor 301 can either enable or disable the NR capability based on the requirements.

The following will describe the MCG split bearer/SCG split bearer configuration.

If the bearer configuration is MCG split bearer or SCG split bearer and connectivity issues are detected in the interfaces associated with the gNB, the processor 301 can determine whether the SCG includes priority bearers carrying priority data. If the SCG includes priority bearers, data transfer can continue through the priority bearers until the data session is completed. Once the data session is completed, RL link failure can be declared. The processor 301 can also declare RL link failure to the eNB. The eNB can allow transfer of data through MCG bearers, if the SCG bearers are not carrying priority data. The eNB can allocate MCG bearers for transfer of data between the UE and the eNB and recover data session that was being carried on the SCG bearers. The allocation of the MCG bearers for transfer of data can take place without releasing the existing RRC session.

The processor 301 can suspend performing 5G signal measurements for a first predefined time period. The processor 301 can initialize a first timer for tracking whether the first predefined time period has expired. The processor 301 can determine whether the connectivity issues in the interfaces associated with the gNB have been resolved on expiration of the first predefined time period. If SCG bearers are added and it is determined that the issues have not been resolved, then a counter can be initialized. The processor 301 can again check whether the issues in the interfaces associated with the gNB have been resolved on expiration of the first predefined time period. The processor 301 can increment the counter at each instance if it is determined that all the connectivity issues in the interfaces associated with the gNB have not been resolved after the expiration of the first predefined time period. If the value of the counter increases beyond a threshold, then the processor 301 determines that the issue is either a long term issue or a permanent issue. On the other hand, if the processor 301 determines that the issues have been resolved, the 5G signal measurements can be reinitiated. The processor 301 can inform the eNB that the connectivity issues have been resolved. The eNB can add SCG bearers for transfer of data packets.

In an embodiment, if the connectivity issue is a long term issue or a permanent issue, the processor 301 can check whether the MCG bearers are carrying priority data. If the MCG bearers are not carrying priority data, the processor 301 can release the RRC connection on the MCG bearers and send a TAU with Dual Connectivity New Radio (DCNR) bit set to 0. If the MCG bearers are carrying priority data, the processor can wait until the priority data transfer is completed. Once the data transfer is complete, the processor 301 can release the RRC connection and update the NR capability (not available) by sending a TAU with DCNR bit set to 0. Once a new RRC session is initialized, a data session that was ongoing using the SCG bearers can continue on the MCG bearers.

The processor 301 can, thereafter, initialize a second timer for a second predefined time period. The processor 301 can enable NR capability and request the eNB to add SCG bearers by sending a TAU after the expiration of the second predefined time period. The second timer tracks whether the second predefined time period has elapsed. If the TAU informing the eNB about the enablement of NR capability is sent prior to expiration of the second predefined time period and at least one issue in the interfaces associated with the gNB continue to persist, the processor 301 may need to again send a TAU to inform the eNB about NR disablement. Thus, there is likelihood of occurrence of a ping-pong scenario of TAU transmissions about enablement and disablement of the NR capability if TAUs are sent prior to expiration of the second predefined time period.

In an embodiment, if the connectivity issue is a long term issue or a permanent issue, the processor 301 can request the eNB to not add SCG bearers in the existing RRC session. The processor 301 can temporarily disable the NR capability of the UE 300. The embodiments include adding a failure Type in ScgFailureInfo of SCGFailureInformationNR, to indicate the eNB about disablement of NR capability.

In an embodiment, if the connectivity issue is a long term connectivity issue or a permanent connectivity issue, the processor 301 can informing the eNB to disable SCG bearers, such that the SCG bearers are not added in the existing RRC session. The processor 301 can add a new cause in the UEAssistanceInformation Information Element (IE) to inform the eNB to disable the SCG bearers.

In an embodiment, the eNB can initialize a SCGFailureInformationNR counter. Each time SCG bearers are added and, if it is determined that the connectivity issues continue to persist; the eNB can increment the SCGFailureInformationNR counter. The SCGFailureInformationNR counter in the UE 300 can parallel the counter that tracks the persistence of connectivity issues in the interfaces associated with the gNB at each instance of expiration of the first predefined time period. If the value of the SCGFailureInformationNR counter increases beyond a threshold value, the eNB refrains from adding SCG bearers for a back-off period. The SCGFailureInformationNR counter can be reset on successful addition of SCG bearers after expiration of the back-off period, release of an existing RRC session, eNB handover, and so on.

The processor 301 can inform the eNB to add SCG bearers for transfer of data through the 5G network if the connectivity issues are resolved. The processor 301 can inform the eNB by sending a TAU with the DCNR bit set to 1. In an embodiment, the processor 301 can inform the eNB, if the processor 301 determines that bandwidth requirements of the UE 300 may not be met through the LTE network alone. In an embodiment, the processor 301 can inform the eNB after the expiration of the second predefined time period. In an embodiment, the processor 301 can inform the eNB prior to the expiration of the second predefined time period, if the processor 301 detects movement of the UE 300. In an embodiment, the processor 301 can inform the eNB prior to or after expiration of the second predefined time period, if the processor 301 detects that the UE 300 is located in a different Tracking Area (TA).

The following will describe the SCG bearer configuration.

If the bearer configuration is SCG bearer, the processor 301 may be configured to determine whether the SCG bearers are carrying priority data through priority bearers, on detecting connectivity issues in the interfaces associated with the gNB. If SCG bearers are carrying priority data, then data transfer can continue through the priority bearers until the data session is completed. Once the data session is completed, the RRC connection on the MCG bearers can be released and a TAU can be sent with the DCNR bit set to 0.

If the SCG bearers are not carrying any priority data, in an embodiment, the RRC connection on the MCG bearers can be released and the TAU (with the DCNR bit set to 0) can be sent. Once a new RRC session is initialized, data session that was ongoing using the SCG bearers would continue on the MCG bearers. The processor 301 can enable NR capability and request the eNB to add SCG bearers after the expiration of the second predefined time period.

If the SCG bearers are not carrying any priority data, in an embodiment, the processor 301 can add a failureType in ScgFailureInfo of SCGFailureInformationNR. This can inform the eNB to allow data transfer only through MCG bearers and prevent addition of SCG bearers in the current RRC connection. Thereafter, data session that was ongoing using the SCG bearers would continue on the MCG bearers. The processor 301 may not attempt to enable NR for a back-off time period. The processor 301 may enable the NR capability and request the eNB to add SCG bearers after the expiration of the back-off time period. If the connectivity issues continue to persist in the interfaces associated with the gNB after the expiration of the back-off time period, the back-off time period can be increased.

If the SCG bearers are not carrying any priority data, in an embodiment, the processor 301 may be configured to add a new cause in UEAssistanceInformation to inform the eNB to disable the SCG bearers. The data transfer can be enabled using MCG bearers. The processor 301 may not attempt to enable NR for a back-off time period. The processor 301 may enable the NR capability and request the eNB to add SCG bearers after the expiration of the back-off time period. If the connectivity issues continue to persist in the interfaces associated with the gNB after the expiration of the back-off time period, the back-off time period can be increased.

FIG. 3 illustrates an exemplary configuration of the UE 300, but the artisan of ordinary skill will understand that the components may be modified, such that other components not illustrated or described could be included in the UE 300, which may be any cellular telephone or device including communication circuitry capable of connecting to a wireless communication network. Further, the labels or names of the components are used only for illustrative purpose and do not limit the scope of the disclosure. One or more components can be combined together to perform same or substantially similar function in the UE 300.

FIGS. 4A, 4B, 4C, and 4D are a flowchart 400 illustrating a method for managing bearer configuration of the UE 300 with EN-DC capability, according to an embodiment. At step 401, connectivity issues existing in interfaces associated with the 5G network may be detected. Examples of the connectivity issues can be, but are not limited to, data stall, heating issues in the UE, issues due to the battery of the UE 300, and so on. Addressing the connectivity issues requires disabling the NR capability of the UE 300. The NR capability may be disabled, if the user requests the disabling of the NR capability or if a request for disabling of the NR capability has been received using artificial intelligence (AI) systems in the UE 300.

At step 402, the method includes determining the bearer configuration of the UE 300. The bearer configuration can be MCG bearer, MCG split bearer (403), SCG split bearer (404), and SCG bearer (405). As connectivity issues have been detected at the interfaces associated with the 5G network, ongoing data session in the SCG bearers can be recovered using the MCG bearers.

If the bearer configuration is MCG split bearer (403) and SCG split bearer (404), the method includes, at step 406, determining whether the SCG includes priority bearers that are carrying priority data. If the SCG includes priority bearers, then the method includes, at step 407, continuing transfer of data through the priority bearers until the data session is completed. Once the data session is completed, the method includes, at step 408, informing the LTE network about failure of RLs in the 5G network. If the SCG does not include priority bearers, the method includes, at step 408, informing the LTE network about the failure of the RLs in the 5G network.

At step 409, the method includes enabling data transfer in current RRC session through the MCG bearers. The 4G network allows data transfer through the MCG bearers. The eNB in the 4G network may not add SCG bearers in the current RRC session for transfer of data and data transfer be enabled through the MCG bearers. At step 410, the method includes continuing transfer of data, which was ongoing using the SCG bearers, through the MCG bearers. The embodiments include resuming the transfer of data through the MCG bearers in the current MCG session. The transfer of data is, thus, resumed without releasing the RRC connection.

Figure 4A:
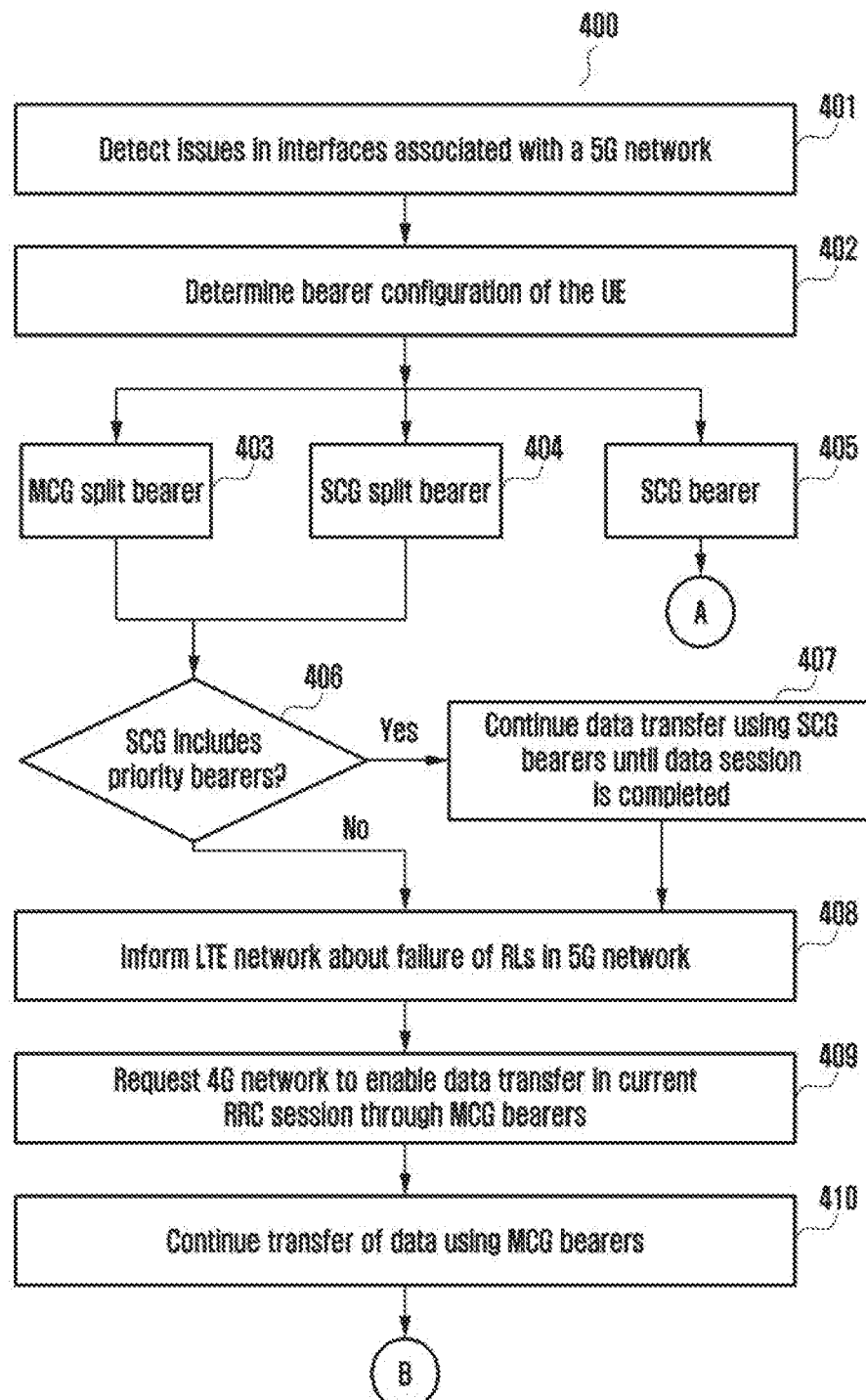
FIGS. 4A, 4B, 4C, and 4D are a flowchart illustrating a method for managing bearer configuration of the UE with EN-DC capability, according to an embodiment.
Figure 4B:
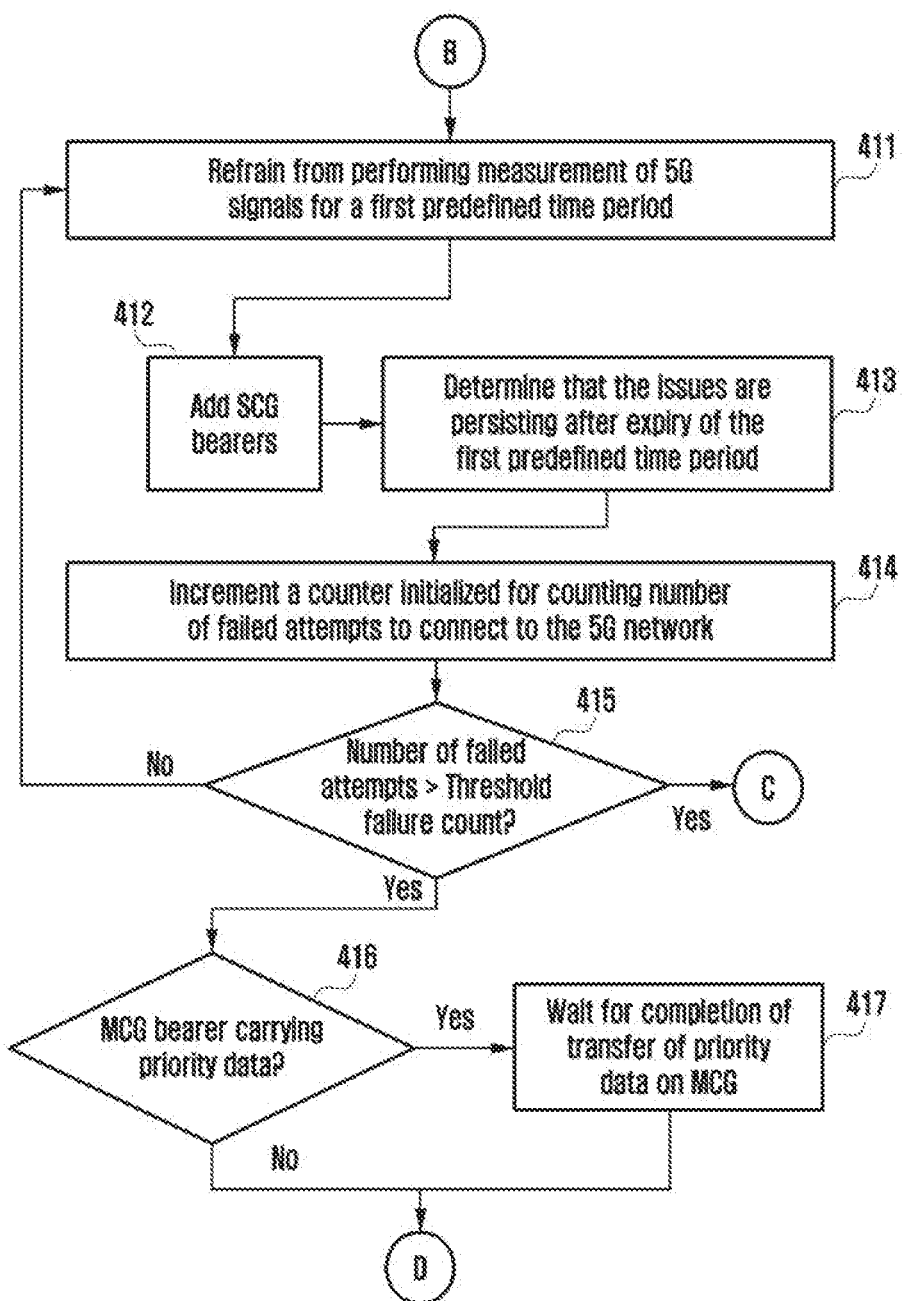

Referring to FIG. 4A, while data is transferred in the current RRC session using the MCG bearers, the method includes, at step 411, refraining from performing 5G signal measurement for the first predefined time period. At step 412, the method includes adding SCG bearers. At step 413, whether the connectivity issues in the interfaces associated with the 5G network continue to persist after expiration of the first predefined time period may be determined. As an example, the first predefined time period may be 2 ms.

At step 414, the method includes incrementing a counter initialized for counting the number of failed attempts to connect to the 5G network. The embodiments include configuring a threshold failure count. If the number of failed attempts is greater than or equal to the threshold failure count, then the connectivity issues can be considered to be either long term or permanent. Considering the example, if it is determined that the connectivity issues persist after 2 ms, it may be considered that the first attempt to connect to the 5G network has failed and the number of failed attempts is incremented to 1. Each time an attempt to connect to the 5G network fails the number of failed attempts is incremented by 1.

At step 415, the method includes determining whether the number of failed attempts is greater than the threshold failure count. As an example, the threshold failure count is 5. If the number of failed attempts is less than the threshold failure count, the embodiments include refraining (step 411) from performing 5G signal measurement for the first predefined time period. Thereafter, the embodiments include attempting to connect to the 5G network again after the expiration of the first predefined time period.

If the connectivity issues continue to persist for more than a threshold time, the method includes determining that the number of failed attempts is greater than the threshold failure count. The threshold time is the time taken to cross the threshold failure count. Considering the example, the threshold time is 10 ms, as the second time is a product of first predefined time period (2 ms) and threshold failure count (5). If the connectivity issues continue to persist for more than the second threshold time, it can be inferred that the number of failed attempts is greater than or equal to 5 and the connectivity issues are either permanent or long term issues.

At step 416, the method includes determining whether the MCG bearers are carrying priority data. If the MCG bearers are carrying priority data, then the method includes, at step 417, waiting for the completion of priority data to be transferred. If it is determined that the MCG bearers are not carrying priority data, the method includes, at step 418, releasing the RRC connection using an Evolved Packet System (EPS) Mobility Management (EMM) status message.

Figure 4C:
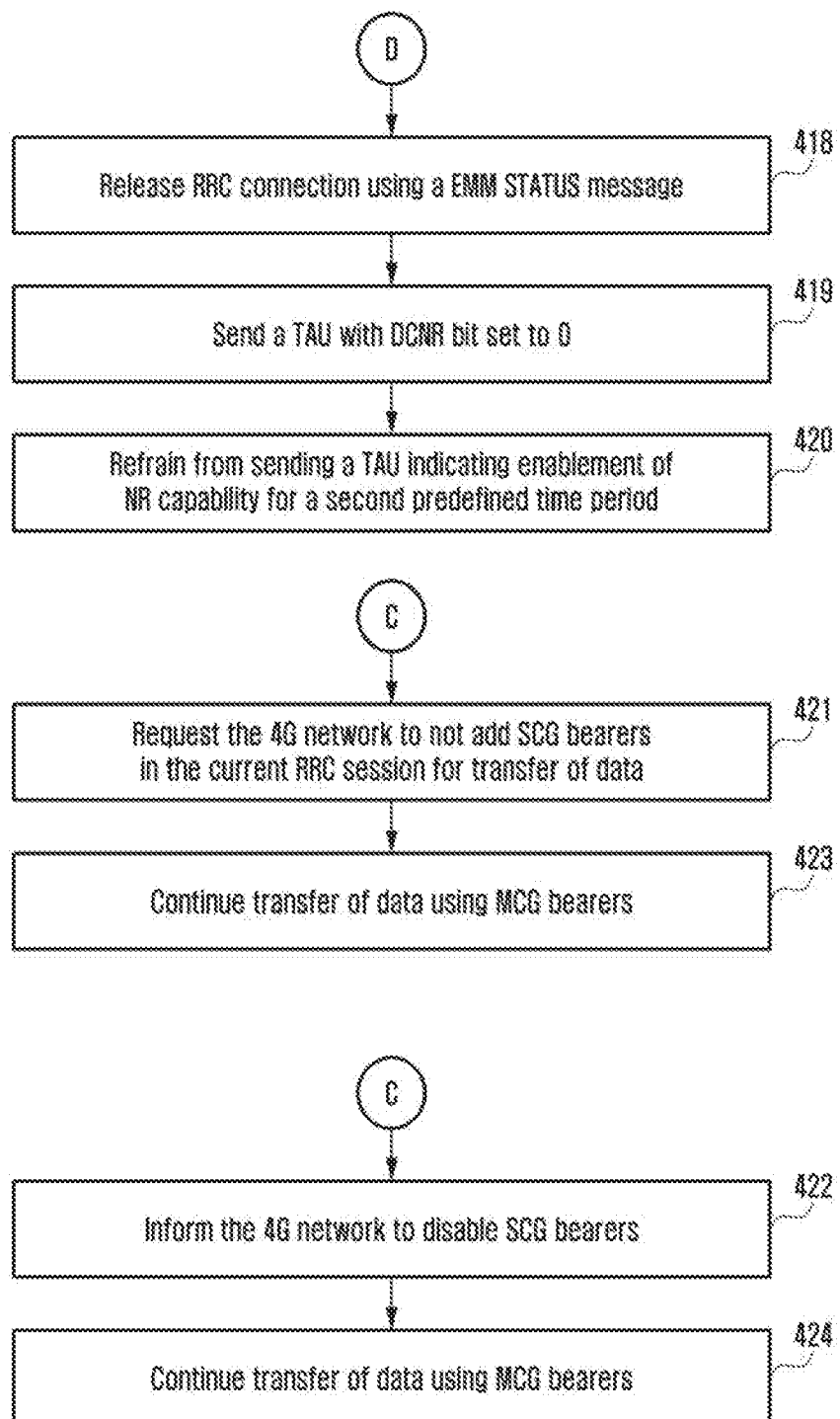

Referring to FIG. 4C, the EMM status Non-Access Stratum (NAS) message can be used to request the EPC for releasing the RRC connection. This can be performed with prior coordination with at least one of an Original Equipment Manufacturer (OEM), an operator, and a core network vendor. In an example, a UE can send an EMM status message in connected mode to request the Mobility Management Entity (MME) to release the RRC connection.

At step 419, the method includes sending a TAU with the DCNR bit set to 0. This can indicate to the eNB that the NR capability is disabled. In an embodiment herein, the UE 300 may be operating in only 4G mode. At step 420, the method includes refraining from sending a TAU indicating enabling of NR capability for a second predefined time period. After the expiration of the second predefined time period, a TAU with the DCNR bit set to 1 can be sent, for indicating the eNB that the UE 300 is operating in EN-DC mode is operating with NR capability.

Figure 4D:
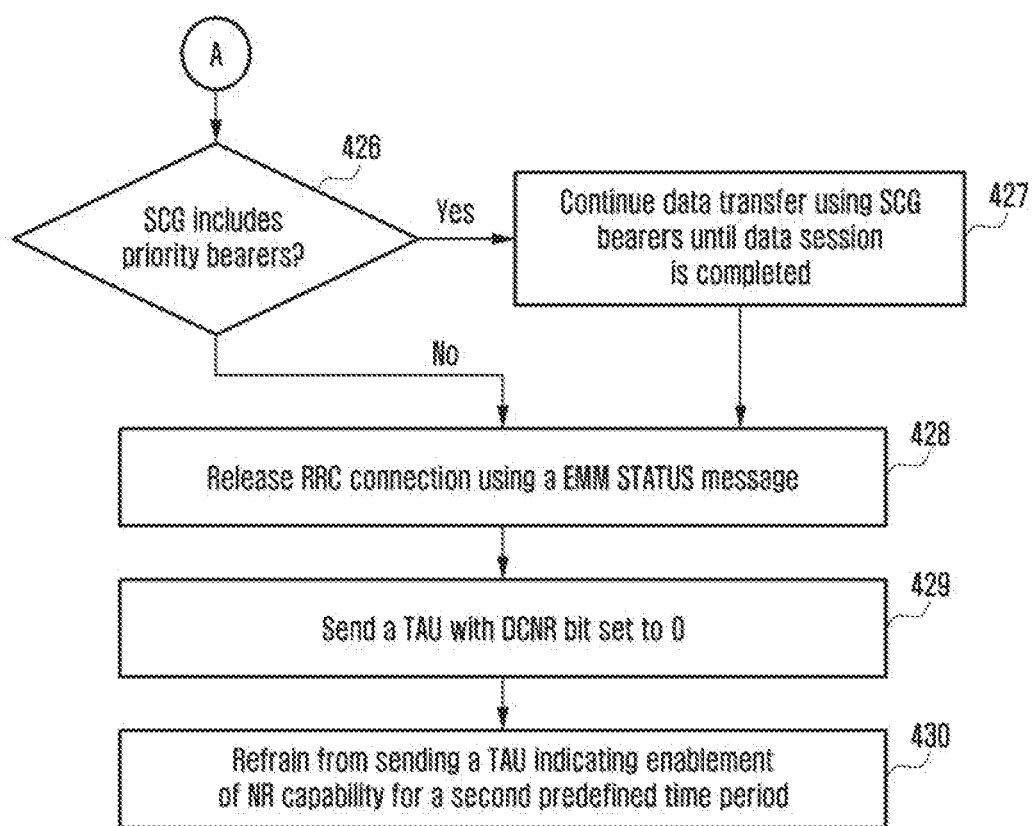

Referring to FIG. 4D, if the bearer configuration is a SCG bearer (405), the method includes performing step 426, whereby it may be determined whether the SCG includes priority bearers carrying priority data. If the SCG includes priority bearers, then the method includes, at step 427, continuing transfer of data through the priority bearers until the data session is completed. Once the data session is completed, the method includes performing steps the 428-430. If it is determined that the SCG does not include priority bearers, the method includes performing the steps 428-430. Ultimately, the RRC connection is released using the EMM status message in step 428. A TAU with the DCNR bit set to 0 is sent to the eNB indicate that the NR capability is disabled in step 429. The method includes refraining from sending a TAU indicating enablement of NR capability for a second predefined time period. Meanwhile, data transfer can continue through the 4G network using the MCG bearers in step 430.

Referring to FIG. 4C, if it is determined (at step 415) that the number of failed attempts is greater than the threshold failure count, the method includes, at step 421, requesting the 4G network to not add SCG bearers in the current RRC session for transfer of data. For example, adding a failure Type in ScgFailureInfo of SCGFailureInformationNR, may be performed to indicate the 4G network about disabling of NR capability. Meanwhile, the data transfer can continue through the MCG bearers (step 423).

In an embodiment, if it is determined (at step 415) that the number of failed attempts is greater than the threshold failure count, the method includes, at step 422, informing the 4G network to disable SCG bearers such that the SCG bearers are not added in the current RRC session for transfer of data. The embodiments include adding a new cause in the UEAssistanceInformation IE to inform the 4G network to disable the SCG bearers. Meanwhile, the data transfer can continue through the MCG bearers (step 424).

The various actions in the flowchart 400 may be performed in the order presented, in a different order, or simultaneously. Further, in some embodiments, some actions listed in FIG. 4 may be omitted.

Figure 5:
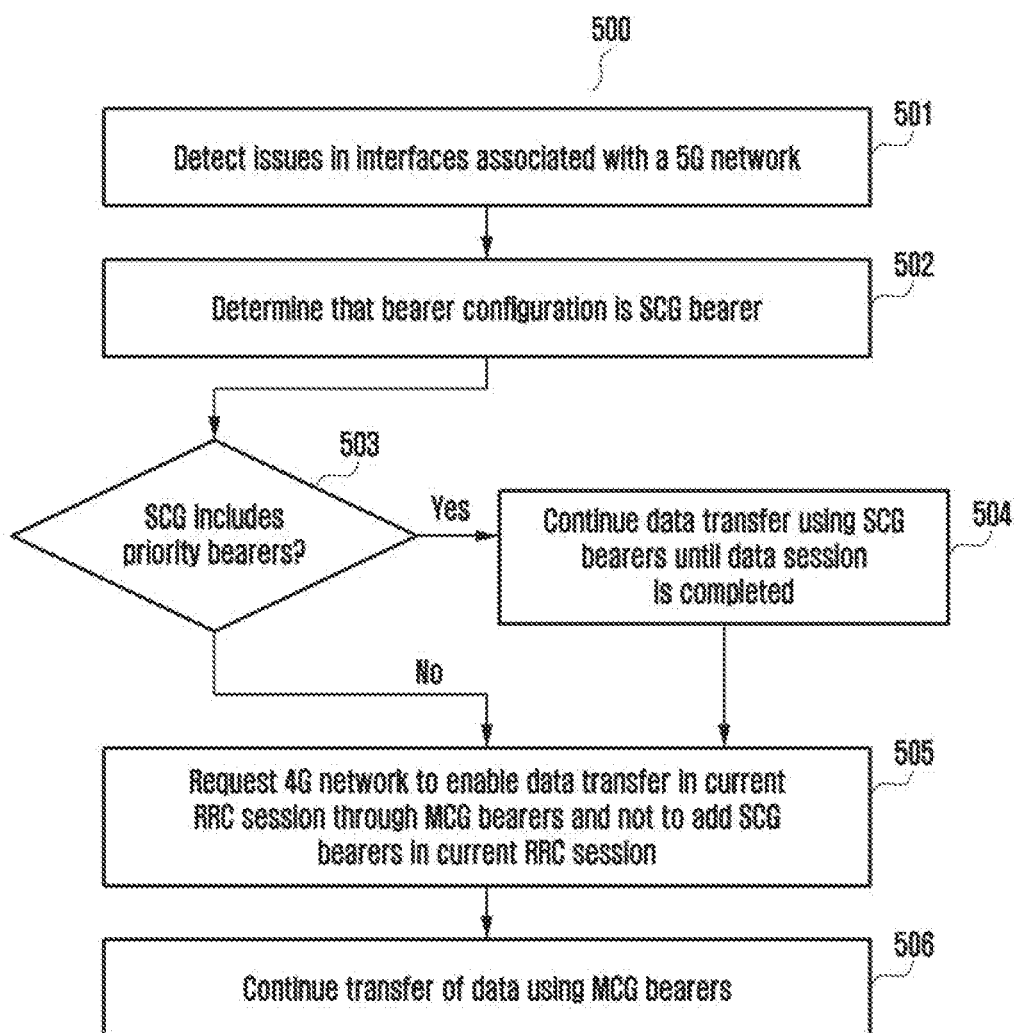
FIG. 5 is a flowchart illustrating a method for managing bearer configuration of the UE with EN-DC capability, according to an embodiment.

FIG. 5 is a flowchart 500 illustrating a method for managing bearer configuration of the UE 300 with EN-DC capability, according to an embodiment. At step 501, the method includes detecting issues existing in interfaces associated with the 5G network. The issues may cause hindrance in transfer of data between the UE 300 and the 5G network. At step 502, the method includes determining if the bearer configuration is SCG bearer. Embodiments herein disable the NR capability of the UE 300 until all the connectivity issues in the interfaces have been resolved. At step 503, the method includes determining whether the SCG includes priority bearers carrying priority data. If the SCG includes priority bearers, the method includes, at step 504, continuing data transfer through the priority bearers until the data session is completed. Once the data session is completed, the method includes, at step 505, requesting the 4G network to enable data transfer in current RRC session through the MCG bearers and not to add SCG bearers in current RRC session. If it is determined that the SCG does not include any priority bearers, the method includes performing step 505.

The embodiments include adding a failureType in ScgFailureInfo of SCGFailureInformationNR to indicate to the eNB that SCG bearers are not to be added in the current RRC session for transfer of data. At step 506, the method includes continuing the transfer of data that was ongoing using the SCG bearers using MCG bearers. The embodiments include enabling the transfer of data through the MCG bearers.

The various actions in the flowchart 500 may be performed in the order presented, in a different order, or simultaneously. Further, in some embodiments, some actions listed in FIG. 5 may be omitted.

Figure 6:
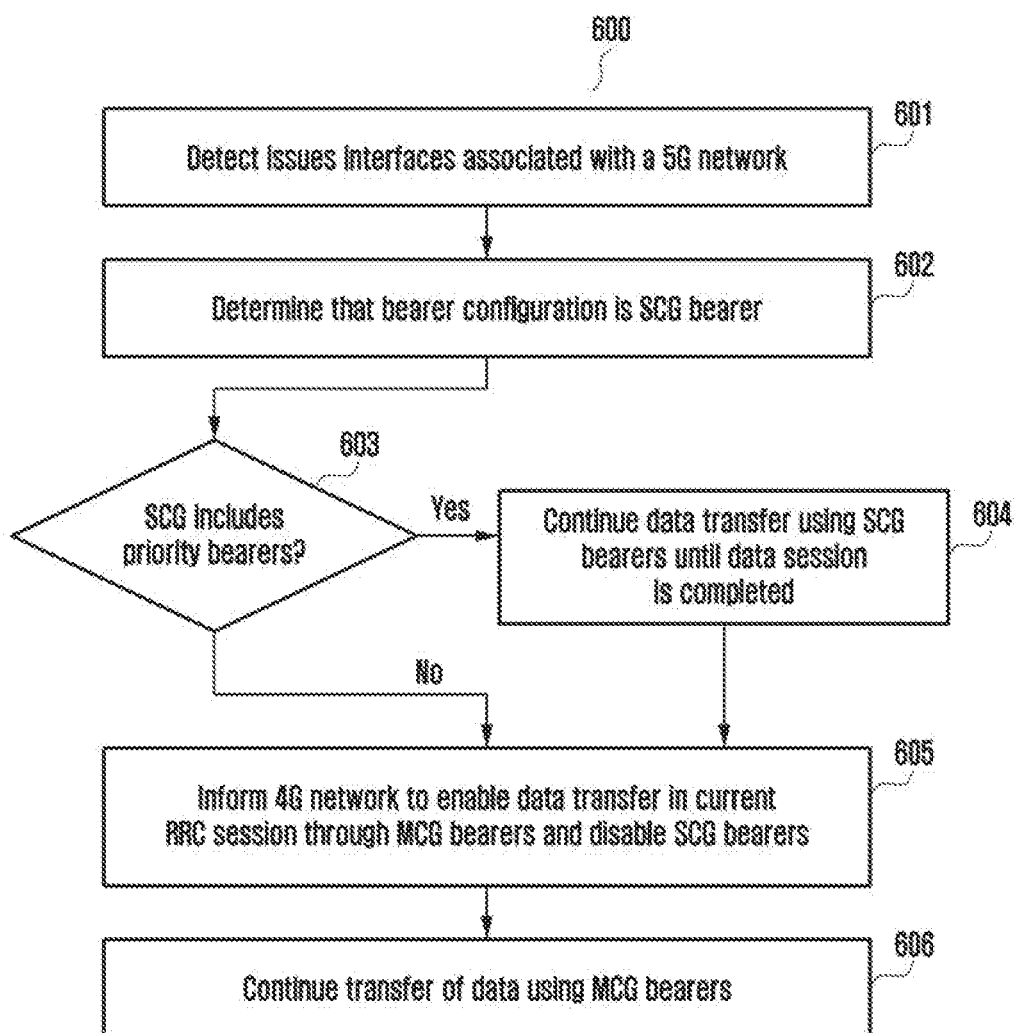
FIG. 6 is a flowchart illustrating a method for managing bearer configuration of the UE with EN-DC capability, according to an embodiment.

FIG. 6 is a flowchart 600 illustrating a method for managing bearer configuration of the UE 300 with EN-DC capability, according to an embodiment. At step 601, the method includes detecting connectivity issues existing in interfaces associated with the 5G network. The connectivity issues may cause hindrance in transfer of data between the UE 300 and the 5G network. At step 602, the method includes determining if the bearer configuration is SCG bearer. Embodiments herein disable the NR capability of the UE 300 until all the connectivity issues in the interfaces have been resolved. At step 603, the method includes determining whether the SCG includes priority bearers carrying priority data. If the SCG includes priority bearers, the method includes, at step 604, continuing data transfer through the priority bearers until the data session is completed. Once the data session is completed, the method includes, at step 605, informing the 4G network to enable data transfer in current RRC session through the MCG bearers in current RRC session and disable the SCG bearers. If it is determined that the SCG does not include any priority bearers, the method includes performing step 605.

The embodiments add a new cause in the UEAssistanceInformation IE to inform the eNB to disable the SCG bearers. At step 606, the method includes continuing the transfer of data that was ongoing using the SCG bearers. The embodiments include enabling the transfer of data through the MCG bearers.

The various actions in the flowchart 600 may be performed in the order presented, in a different order, or simultaneously. Further, in some embodiments, some actions listed in FIG. 6 may be omitted.

Figure 7:
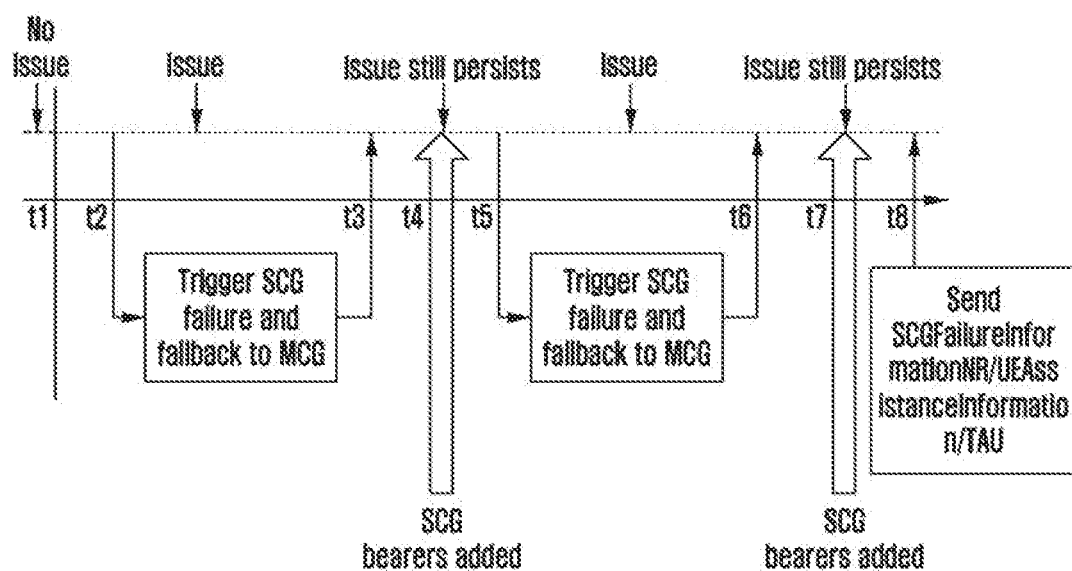
FIG. 7 is a timing diagram illustrating a process of handling bearer configuration if there is an occurrence of a long term issue in interfaces associated with the 5G network, according to an embodiment.

FIG. 7 is a timing diagram illustrating the process of handling bearer configuration, if there is an occurrence of a long term connectivity issue in interfaces associated with the 5G network, according to an embodiment. The timing diagram is applicable for MCG split bearer and SCG split bearer configuration. It is to be noted that the time intervals between the labeled time instants (t1, t2, t3, and so on) are not to be scaled. As depicted in FIG. 7, at time t1, there is an occurrence of an issue in the interfaces associated with the 5G network. At time t2, the connectivity issue may be detected. The time period between t1 and t2 can be considered as a deadlock period. As long as the connectivity issue persists, the embodiments include changing the bearer configuration to MCG bearers. At time t3, data on the MCG bearers may be received and transfer of data (that was ongoing over the SCG bearers) using the MCG bearers in a current RRC session may be continued. Thus, transfer of data can be continued without disrupting the RRC session. The embodiments include informing the eNB about disabling of NR capability by triggering SCG failure. This can indicate to the network to prevent adding SCG bearers in the current RRC session.

At time t4, SCG bearers may be added. The time period between t3 and t4 can be considered as the first predefined time period. During this period, performing 5G signal measurements may be suspended. At time t5, continuing connectivity issues in the interfaces may be determined. The counter initialized to keep a track on the number of failure attempts is incremented. As an example, consider that the threshold number of failure attempts is 2. The steps as discussed above may be performed on determining that the connectivity issues still persist. At time t6, data on the MCG bearers may be received, thereby continuing the transfer of data using the MCG bearers. At time t7, SCG bearers may be added.

The time period between t6 and t7 can also be considered as the first predefined time period. At time t8, it may be detected that the connectivity issues in the interfaces are still persisting. The counter is again incremented and the value becomes equal to the threshold number of failure attempts. Thereby, it may be determined that the detected connectivity issue is a long term connectivity issue.

In an embodiment, at time t8, a TAU with the DCNR bit set to 0 may be transmitted to the eNB to indicate disabling of the NR capability. The TAU can be sent and consequently the RRC connection can be released once it is ensured that the MCG bearers do not carry any priority data. Otherwise the TAU can be sent after the completion of transfer of the priority data.

In another embodiment, SCGFailureInformationNR can be sent to the eNB to indicate disabling of the NR capability. The embodiments include requesting the eNB to not add SCG bearers in a current RRC session for transfer of data.

In yet another embodiment, UEAssistanceInformation can be sent to the eNB to indicate disabling of the NR capability. The embodiments allow the 4G network to disable SCG bearers.

The embodiments disclosed herein can be implemented through at least one software program running on at least one hardware device and performing network management functions to control the network elements. For example, the methods described above may be executed under control of the processor 310 of the UE 300 illustrated in FIG. 3 by executing software stored in and accessed from the memory 302.

The embodiments disclosed herein describe methods and systems for managing bearer configuration in EN-DC system. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for managing bearer configuration of a User Equipment (UE) with Evolved-Universal Terrestrial Radio Access Network-New Radio-Dual Connectivity (E-UTRAN-NR-DC) (EN-DC) capability, the method comprising:
   detecting, by the UE, an interruption of an ongoing data session due to occurrence of at least one connectivity issue in at least one interface associated with a Fifth Generation (5G) network of the UE;
   determining, by the UE, a bearer configuration of the UE;
      based on determining that the bearer configuration is one of a Master Cell Group (MCG) split bearer and a Secondary Cell Group (SCG) split bearer, signaling, by the UE, that the at least one connectivity issue is detected in the UE to a Fourth Generation (4G) network to which the UE is connected;
   periodically performing, by the UE, 5G signal measurements, wherein the 5G measurements are performed with a periodicity of a first predefined time period;
   detecting whether the at least one connectivity issue continues to persist after expiration of the first predefined time period, wherein persistence of the at least one connectivity issue is detected by at least one of the UE and the 4G network;
   determining, by the UE, a count of failed attempts to connect to the 5G network if the at least one connectivity issue continues to persist after the expiration of the first predefined time period, wherein the count is incremented if the at least one connectivity issue continues to persist;
   determining, by the UE, that the count is greater than a predefined threshold number of failed attempts;
   performing, by the UE, at least one of:
      requesting the 4G network to prevent adding SCG bearers in a current MCG Radio Resource Control (RRC) session;
      requesting the 4G network to disable the SCG bearers; and
      sending a first Tracking Area Update (TAU) to the 4G network after releasing the current MCG RRC session if there is no ongoing transfer of priority data through the MCG bearers,
   wherein the first TAU indicates disabling of NR capability of the UE, and
   wherein recovery of the ongoing data session is initiated in a new MCG RRC session.

2. The method, as claimed in claim 1, wherein the signaling comprises the UE informing the 4G network by indicating failure of at least one Radio Link (RL) associated with an SCG bearer of one of the MCG split bearer and the SCG split bearer, and
   wherein the SCG bearer is not carrying priority data.

3. The method, as claimed in claim 1, further comprising:
   receiving, by the UE, an update in the bearer configuration, wherein the update indicates transfer of data, between the 4G network and the UE, through MCG bearers in the current RRC session; and
   initiating, by the UE, recovery of the interruption of the ongoing data session, ongoing through one of the MCG split bearer and the SCG split bearer, through the MCG bearers in one of the current MCG Radio Resource Control (RRC) session and the new MCG RRC session.

4. The method, as claimed in claim 1, further comprising requesting the 4G network to add SCG bearers for initiating data transfer through at least one of the MCG split bearer and the SCG split bearer on determining that the at least one connectivity issue is resolved.

5. The method, as claimed in claim 1, wherein the method further comprises sending a second TAU to the 4G network to indicate enabling of the NR capability of the UE, wherein the second TAU is sent on fulfillment of at least one condition comprising:
  expiration of a second predefined time period, wherein the second predefined time period is initiated after sending the first TAU;
  bandwidth provided by the 4G network is not sufficient to meet bandwidth requirement of the UE;
  detection of movement of the UE; and
  detection of change in Tracking Area (TA) of the UE,
  wherein the current MCG RRC session is released by sending an Evolved Packet System (EPS) Mobility Management (EMM) status message to the 4G network.

6. The method, as claimed in claim 1, wherein the at least one connectivity issue comprises:
  Packet Data Convergence Protocol (PDCP) error, RL failure, not meeting a predefined Quality of Service (QoS) requirement, temperature of UE greater than a predefined threshold temperature, number of transmissions of Negative Acknowledgements (NACKS) in a Radio Link Control (RLC) layer greater than a predefined threshold, data rate is below a predefined threshold, State of Charge (SoC) of battery of the UE below a predefined threshold, and reception of a NR disablement request triggered by at least one of an Artificial Intelligence (AI) engine of the UE and a user.

7. The method, as claimed in claim 1, wherein the method further comprises:
  based on determining that the bearer configuration is a Secondary Cell Group (SCG) split bearer, signaling, by the UE, the 4G network to allow transfer of data between the 4G network and the UE through MCG bearers and prevent addition of SCG bearers in the current MCG RRC session; and
  initiating, by the UE, recovery of the interruption of the ongoing data session through the MCG bearers in the current MCG RRC session.

8. The method, as claimed in claim 7, further comprising requesting the 4G network to add SCG bearers after expiration of an SCG back-off period, and
  adding, by the 4G network, the SCG bearers after the expiration of the SCG back-off period,
  wherein the SCG back-off period is initiated by the 4G network after being informed by the UE to prevent addition of the SCG bearers in the current MCG RRC session,
  wherein the SCG back-off period is initiated by the 4G network if a value of a counter, initialized by the 4G network, is greater than a threshold number of failures of adding the SCG bearers, and
  wherein the 4G network periodically attempts to add the SCG bearers after expiration of the current MCG RRC session.

9. A User Equipment (UE), with Evolved-Universal Terrestrial Radio Access Network-New Radio-Dual Connectivity (E-UTRAN-NR-DC) (EN-DC) capability, for managing bearer configuration of the UE, the UE comprising at least one processor configured to:
  detect interruption in an ongoing data session due to an occurrence of at least one connectivity issue in at least one interface associated with a Fifth Generation (5G) network of the UE;
  determine a bearer configuration of the UE;
  based on determining that the bearer configuration is one of a Master Cell Group (MCG) split bearer and a Secondary Cell Group (SCG) split bearer, signal a Fourth Generation (4G) that the at least one connectivity issue is detected in the UE;
  periodically perform 5G signal measurements, wherein the 5G measurements are performed with a periodicity of a first predefined time period;
  detect whether the at least one connectivity issue continues to persist after expiration of the first predefined time period, wherein persistence of the at least one connectivity issue is detected by at least one of the UE and the 4G network;
  determine a count of failed attempts to connect to the 5G network if the at least one connectivity issue continues to persist after the expiration of the first predefined time period, wherein the count is incremented if the at least one connectivity issue continues to persist;
  determine that the count is greater than a predefined threshold number of failed attempts;
  perform at least one of:
    request the 4G network to prevent adding SCG bearers in a current MCG Radio Resource Control (RRC) session;
    request the 4G network to disable the SCG bearers; and
    send a first Tracking Area Update (TAU) to the 4G network after releasing the current MCG RRC session if there is no ongoing transfer of priority data through the MCG bearers,
  wherein the first TAU indicates disabling of NR capability of the UE, and wherein recovery of the ongoing data session is initiated in a new MCG RRC session.

10. The UE, as claimed in claim 9, wherein the at least one processor is further configured to signal the 4G network by indicating failure of at least one Radio Link (RL) associated with an SCG bearer of one of the MCG split bearer and the SCG split bearer, and
  wherein the SCG bearer is not carrying priority data.

11. The UE, as claimed in claim 9, wherein the at least one processor is further configured to:
  receive an update in the bearer configuration, wherein the update indicates transfer of data, between the 4G network and the UE, through MCG bearers in a current MCG Radio Resource Control (RRC) session; and
  initiate recovery of the interruption of the ongoing data session, ongoing through one of the MCG split bearer and the SCG split bearer through the MCG bearers in one of a current MCG RRC session and the new MCG RRC session.

12. The UE, as claimed in claim 9, wherein the at least one processor is further configured to request the 4G network to add SCG bearers to initiate data transfer through at least one of the MCG split bearer and the SCG split bearer on determining that the at least one connectivity issue is resolved.

13. The UE, as claimed in claim 9, wherein the at least one processor is further configured to send a second TAU to the 4G network to indicate enablement of the NR capability of the UE, wherein the second TAU is sent on fulfillment of at least one condition comprising:

expiration of a second predefined time period, wherein the second predefined time period is initiated after sending the first TAU;

bandwidth provided by the 4G network is not sufficient to meet bandwidth requirement of the UE;

detection of movement of the UE; and detection of change in Tracking Area (TA) of the UE, wherein the current MCG RRC session is released by sending an Evolved Packet System (EPS) Mobility Management (EMM) status message to the 4G network.

14. The UE, as claimed in claim 9, wherein the at least one connectivity issue comprises:

Packet Data Convergence Protocol (PDCP) error, RL failure, not meeting a predefined Quality of Service (QoS) requirement, temperature of UE greater than a predefined threshold temperature, number of transmissions of Negative Acknowledgements (NACKS) in a Radio Link Control (RLC) layer greater than a predefined threshold, data rate is below a predefined threshold, State of Charge (SoC) of battery of the UE below a predefined threshold, and reception of a NR disablement request triggered by at least one of an Artificial Intelligence (AI) engine of the UE and a user.

15. The UE, as claimed in claim 9, wherein the at least one processor is further configured to:

based on determining that the bearer configuration is a Secondary Cell Group (SCG) split bearer, signal the 4G network to allow transfer of data between the 4G network and the UE through MCG bearers and prevent addition of SCG bearers in the current MCG RRC session; and initiate recovery of the interruption of the ongoing data session through the MCG bearers in the current MCG RRC session.

16. The UE, as claimed in claim 15, wherein the at least one processor is further configured to request the 4G network to add SCG bearers after expiration of an SCG back-off period, and wherein the SCG back-off period is initiated by the 4G network after the UE informs the 4G network to prevent addition of the SCG bearers in the current MCG RRC session, wherein the at least one processor is further configured to request the 4G network to add SCG bearers after the expiration of the SCG back-off period, wherein the SCG back-off period is initiated by the 4G network if a value of a counter, initialized by the 4G network, is greater than a threshold number of failures of adding the SCG bearers, and wherein the 4G network periodically attempts to add the SCG bearers after expiration of the current MCG RRC session.

* * * * *